US012431651B2

(12) United States Patent
Morello et al.

(10) Patent No.: US 12,431,651 B2
(45) Date of Patent: Sep. 30, 2025

(54) ELECTRICAL CONNECTOR ASSEMBLY WITH MOVEABLE INNER INSULATOR AND TERMINAL

(71) Applicant: Aptiv Technologies AG, Schaffhausen (CH)

(72) Inventors: John R. Morello, Warren, OH (US); James M. Rainey, Warren, OH (US); Joon Lee, Carmel, IN (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 293 days.

(21) Appl. No.: 18/220,032

(22) Filed: Jul. 10, 2023

(65) Prior Publication Data

US 2024/0063567 A1 Feb. 22, 2024

Related U.S. Application Data

(60) Provisional application No. 63/398,374, filed on Aug. 16, 2022.

(51) Int. Cl.
*H01R 13/15* (2006.01)
*H01R 9/05* (2006.01)
(Continued)

(52) U.S. Cl.
CPC ............... *H01R 13/15* (2013.01); *H01R 9/05* (2013.01); *H01R 13/17* (2013.01); *H01R 13/187* (2013.01);
(Continued)

(58) Field of Classification Search
CPC .......... H01R 13/15; H01R 9/05; H01R 13/17; H01R 13/187; H01R 13/2421; H01R 13/2485; H01R 13/516; H01R 13/6581; H01R 9/0512; H01R 9/0518; H01R 13/00; H01R 13/02; H01R 13/18; H01R 13/24; H01R 13/2407; H01R 13/2478; H01R 13/6591; H01R 13/65912; H01R 13/6592; H01R 24/40
See application file for complete search history.

(56) References Cited

U.S. PATENT DOCUMENTS

| | | | | |
|---|---|---|---|---|
| 6,174,172 | B1 | 1/2001 | Kazama | |
| 8,926,376 | B2 | 1/2015 | Mori | |
| 2019/0221969 | A1* | 7/2019 | Ruffini ............... | H01R 13/6315 |

* cited by examiner

*Primary Examiner* — Justin M Kratt
(74) *Attorney, Agent, or Firm* — Billion & Armitage

(57) ABSTRACT

An electrical connector assembly includes a central electrical terminal connected to a cable terminal attached to an end of a central conductor of an electrical cable configured to mate with a corresponding mating central electrical terminal. The central electrical terminal comprises a helical coil spring in compressive contact with the cable terminal. The assembly also includes an insulative housing defining a cavity in which the central electrical terminal is affixed and a shield terminal in which the insulative housing, central electrical terminal, and coil spring are disposed. The insulative housing is configured to move longitudinally within the shield terminal. The coil spring exerts a longitudinal force on the central electrical terminal and the insulative housing to maintain mechanical contact between the insulative housing and a corresponding insulative housing in which the corresponding mating central electrical terminal is disposed.

17 Claims, 12 Drawing Sheets

(51) Int. Cl.

| | |
|---|---|
| ***H01R 13/17*** | (2006.01) |
| ***H01R 13/187*** | (2006.01) |
| ***H01R 13/24*** | (2006.01) |
| ***H01R 13/516*** | (2006.01) |
| ***H01R 13/6581*** | (2011.01) |
| *H01R 13/00* | (2006.01) |
| *H01R 13/02* | (2006.01) |
| *H01R 13/18* | (2006.01) |
| *H01R 13/6591* | (2011.01) |
| *H01R 13/6592* | (2011.01) |
| *H01R 24/40* | (2011.01) |

(52) U.S. Cl.

CPC ..... *H01R 13/2421* (2013.01); *H01R 13/2485* (2013.01); *H01R 13/516* (2013.01); *H01R 13/6581* (2013.01); *H01R 9/0512* (2013.01); *H01R 9/0518* (2013.01); *H01R 13/00* (2013.01); *H01R 13/02* (2013.01); *H01R 13/18* (2013.01); *H01R 13/24* (2013.01); *H01R 13/2407* (2013.01); *H01R 13/2478* (2013.01); *H01R 13/6591* (2013.01); *H01R 13/65912* (2020.08); *H01R 13/6592* (2013.01); *H01R 24/40* (2013.01)

ELECTRICAL CONNECTOR ASSEMBLY WITH MOVEABLE INNER INSULATOR AND TERMINAL

CROSS-REFERENCE TO RELATED APPLICATION

This application claims benefit of priority to U.S. Application No. 63/398,374 filed on Aug. 16, 2022, the entire disclosure of which is hereby incorporated by reference.

TECHNICAL FIELD

This application is directed to an electrical connector assembly that includes a spring loaded moveable inner insulator and electrical terminal.

BRIEF SUMMARY

According to one or more aspects of the present disclosure, an electrical connector assembly includes a central electrical terminal connected to a cable terminal attached to an end of a central conductor of an electrical cable configured to mate with a corresponding mating central electrical terminal. The central electrical terminal includes a helical coil spring in compressive contact with the cable terminal. The electrical connector assembly also includes an insulative housing defining a cavity in which the central electrical terminal is affixed and a shield terminal in which the insulative housing, central electrical terminal, and coil spring are disposed. The insulative housing is configured to move longitudinally within the shield terminal and wherein the coil spring exerts a longitudinal force on the central electrical terminal and insulative housing to maintain mechanical contact between the insulative housing and a corresponding insulative housing in which the corresponding mating central electrical terminal is disposed.

In some aspects of the electrical connector assembly described in the preceding paragraph, a first portion of the coil spring is in radially compressive contact with the central electrical terminal.

In some aspects of the electrical connector assembly described in any one of the preceding paragraphs, coils of a second portion of the coil spring are spaced apart from one another when the coil spring is in a relaxed condition.

In some aspects of the electrical connector assembly described in any one of the preceding paragraphs, coils of a third portion of the coil spring are touching one another when the coil spring is in a relaxed condition.

In some aspects of the electrical connector assembly described in any one of the preceding paragraphs, coils of a third portion of the coil spring in which the central electrical terminal is not disposed are touching one another when the coil spring is in a relaxed condition.

In some aspects of the electrical connector assembly described in any one of the preceding paragraphs, a portion of the central electrical terminal is received within the coil spring and is rod-shaped.

In some aspects of the electrical connector assembly described in any one of the preceding paragraphs, the central conductor of the electrical cable is arranged perpendicularly to the central electrical terminal.

In some aspects of the electrical connector assembly described in any one of the preceding paragraphs, the insulative housing is movable between a rearward stop and a forward stop.

In some aspects of the electrical connector assembly described in any one of the preceding paragraphs, the forward stop is provided by an indentation in the shield terminal.

In some aspects of the electrical connector assembly described in any one of the preceding paragraphs, the rearward stop is provided by the coil spring when in a fully compressed condition.

In some aspects of the electrical connector assembly described in any one of the preceding paragraphs, the electrical contact attached to the central conductor of the electrical cable defines a spherical sector shaped electrical contact.

In some aspects of the electrical connector assembly described in any one of the preceding paragraphs, the electrical contact is an electrically conductive sphere attached to an end of the central conductor of the electrical cable.

In some aspects of the electrical connector assembly described in any one of the preceding paragraphs, the insulative housing is a first insulative housing defining a first cavity.

In some aspects of the electrical connector assembly described in any one of the preceding paragraphs, the first insulative housing is disposed within a first section of the shield terminal.

In some aspects of the electrical connector assembly described in any one of the preceding paragraphs, the assembly further includes a second insulative housing defining a second cavity in which the electrical contact and an end of the central conductor of the electrical cable are disposed.

In some aspects of the electrical connector assembly described in any one of the preceding paragraphs, the second insulative housing is disposed in a second section of the shield terminal attached to the first section of the shield terminal.

In some aspects of the electrical connector assembly described in any one of the preceding paragraphs, a forward edge of the second insulative housing provides the rearward stop.

BRIEF DESCRIPTION OF THE DRAWINGS

The present invention will now be described by way of example with reference to the accompanying drawings, in which.

DETAILED DESCRIPTION

Figure 1:
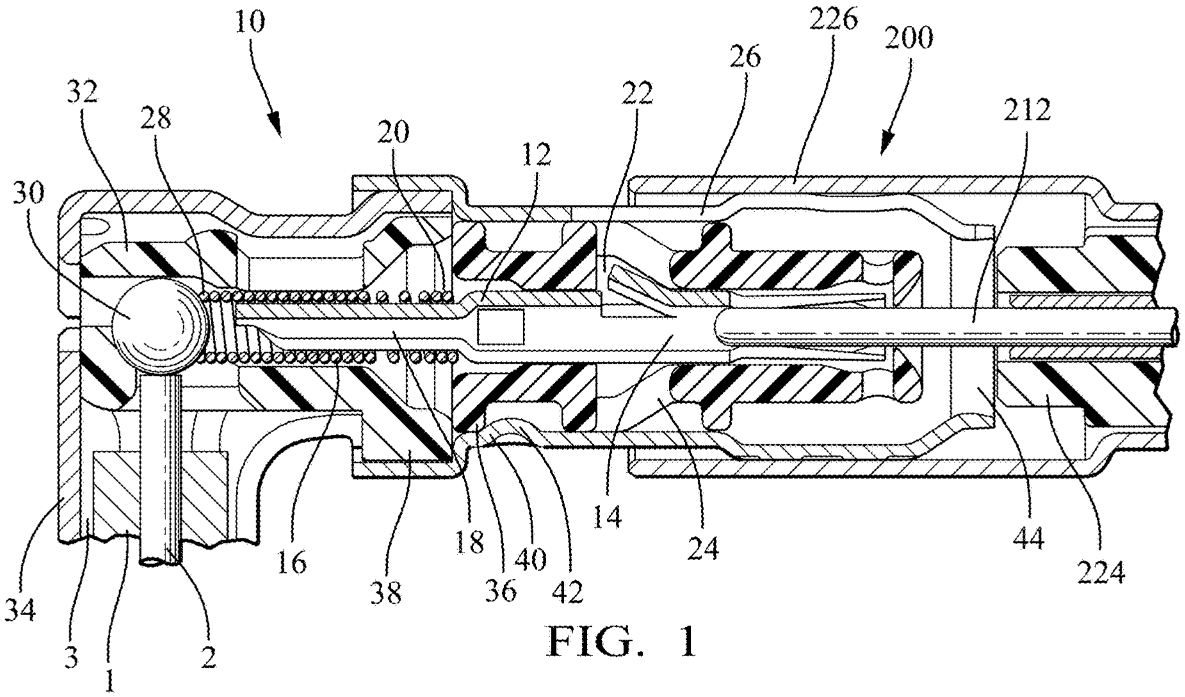
FIG. 1 shows a cross-section view of an electrical connector assembly with a central electrical terminal disposed within an insulative housing that is held in a fixed position in a shield terminal according to some embodiments.

FIG. 1 shows a non-limiting example of a right-angled electrical connector assembly which includes a first electrical connector 10 having a central electrical terminal 12. In the present embodiment, the central electrical terminal 12 is a female electrical terminal. The central electrical terminal 12 includes a tubular portion 14 configured to receive a corresponding mating central electrical terminal 212 of a mating second electrical connector 200, shown here in the form of a cylindrical pin. The central electrical terminal 12 also includes a coil spring 16 and a rod-like portion 18 extending from the tubular portion 14 is received in a first end 20 of the coil spring 16. The central electrical terminal 12 is disposed within a cavity 22 of a first insulative housing 24 which is surrounded by a first electrical shield terminal 26. The coil spring 16 has a second end 28 opposite the first end 20 that is in electrical and mechanical contact with a spherical sector shaped electrical contact 30 connected to the end of a central conductor 2 of an electrical cable 1. In the present embodiment, the electrical cable 1 is a coaxial cable. The coil spring 16 and the electrical contact 30 are disposed within a second insulative housing 32 enclosed within a second shield terminal 34 that is connected to the first shield terminal 26. The second insulative housing 32 and second shield terminal 34 hold the coaxial cable 1 at a perpendicular orientation to the central electrical terminal 12. The first insulative housing 24, and thereby the central electrical terminal 12 are maintained in a fixed position within the first shield terminal 26 by a lateral rib 36 projecting from the first insulative housing 24 that is held between a rearward stop 38 provided by a forward surface of the second insulative housing 32 and a forward stop 40 provided by an indentation 42 formed in the first shield terminal 26. The central electrical terminal 12 is configured to terminate the central conductor 2 of the coaxial cable 1 and the first and second electrical shield terminals 26, 34 terminate a shield conductor 3 of the coaxial cable 1.

As shown in FIG. 1 the second electrical connector 200 also includes a mating shield terminal 226 that connects with the first shield terminal 24 of the first electrical connector 10 and an insulative housing 224 in which the mating central electrical terminal 212 is contained.

Figure 2:
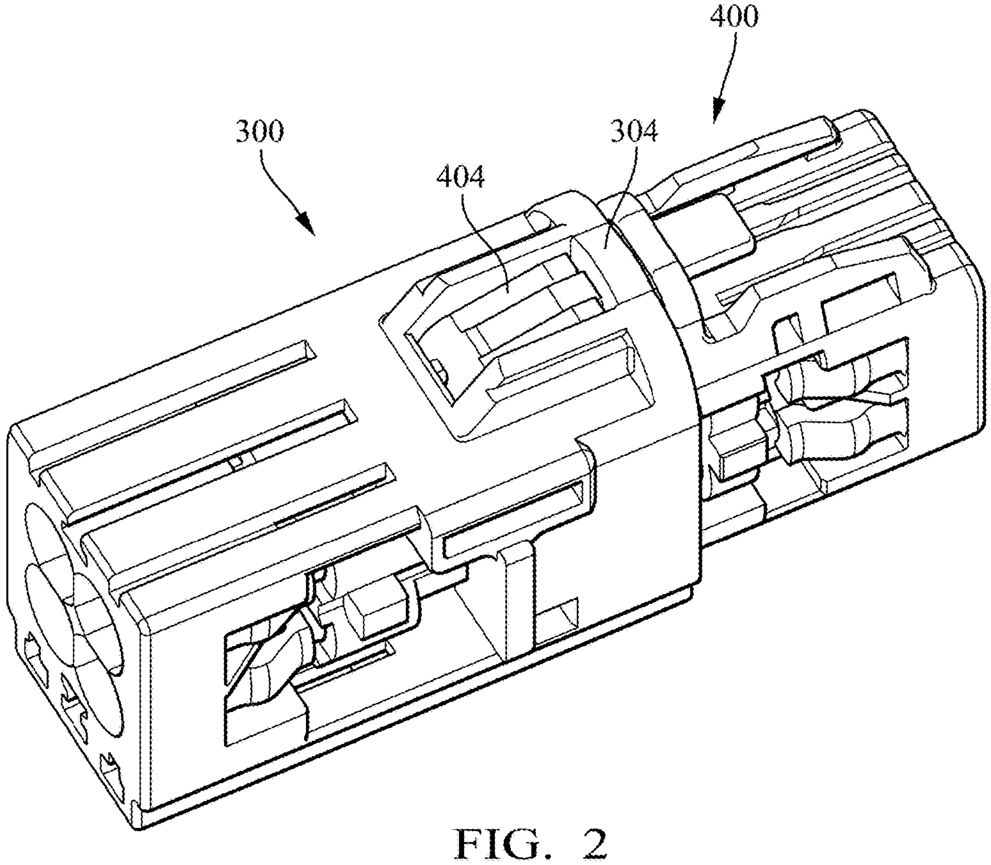
FIG. 2 shows a perspective view of a connector housing assembly having a connector locking mechanism in which the electrical connector assembly of FIG. 1 may be disposed according to some embodiments.
Figure 3:
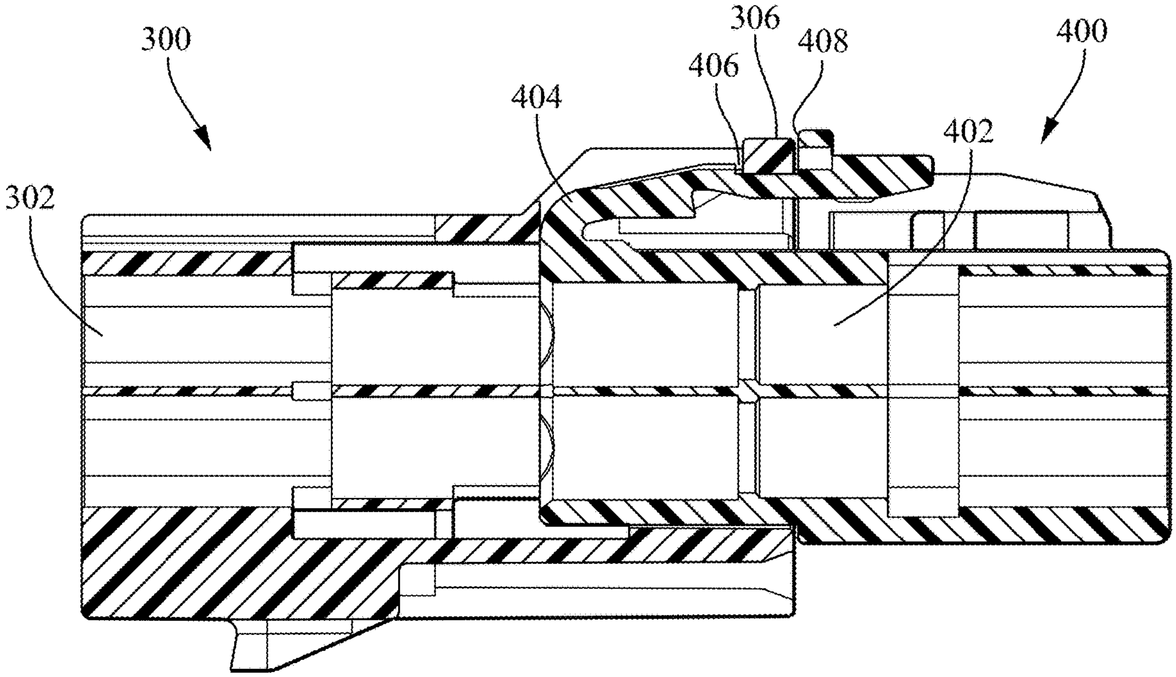
FIG. 3 shows a cross section view of the connector housing assembly of FIG. 2 with the connector locking mechanism in a forward position according to some embodiments.
Figure 4:
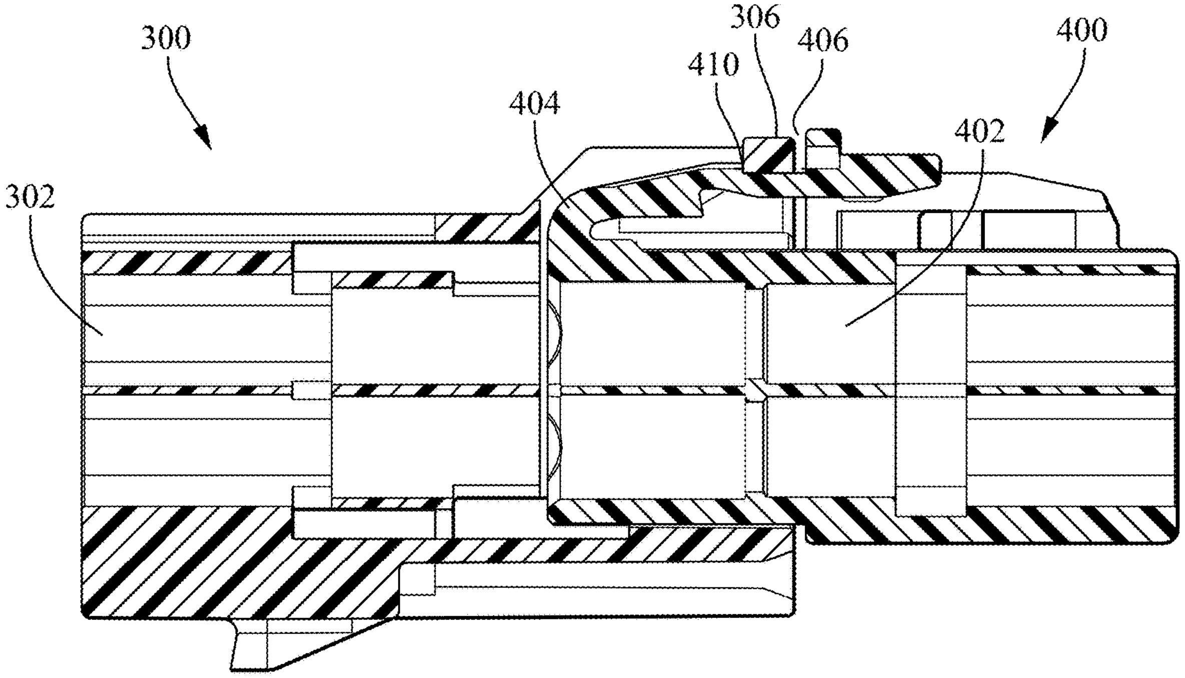
FIG. 4 shows a cross section view of the connector housing assembly of FIG. 2 with the connector locking mechanism in a rearward position according to some embodiments.

The first and second electrical connectors 10, 200 may also include housing assemblies 300, 400 as shown in FIGS. 2-4. The first and second electrical connectors 10, 200 may be contained within connector cavities 302, 402 in the housing assemblies 300, 400. As shown in FIG. 1, there may be a gap 44 between the first insulative housing 24 and the insulative housing 224 when the first and second electrical connectors 10, 200 are fully mated within connector housing assemblies 300, 400 as shown in FIGS. 2-4. This gap 44 may be caused by connector locking features 304, 404 on the housing assemblies 300, 400 which require some overtravel to operate properly when the connector lock tab 306 of locking feature 304 is near a rearward-most location 408 in a connector lock slot 406 of the locking feature 404, as shown in FIG. 3, or near a forward-most location 410 in the connector lock slot 406 of the locking feature 404, as shown in FIG. 4. The gap 44 between the first insulative housing 24 and the insulative housing 224 results in part of the connection between the central electrical terminals 12, 212 having a different dielectric material between the central electrical terminals 12, 212 and the first shield terminal 26 and the mating shield terminal 226. More specifically, the resulting dielectric material is air versus the insulative material of the first insulative housing 24 and insulative housing 224. This dielectric difference causes a capacitive discontinuity between the central electrical terminals 12, 212 and the shield terminals 26, 226 which degrades the radio frequency (RF) performance of the electrical connector assembly.

Figure 5:
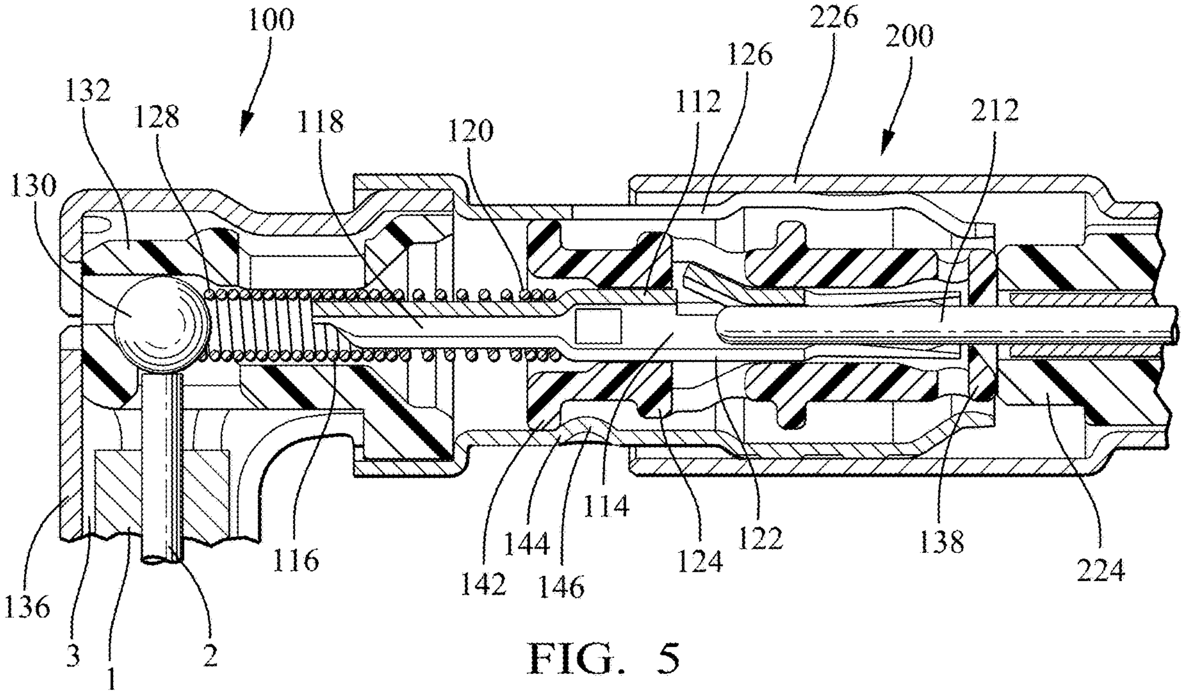
FIG. 5 shows a cross-section view of an electrical connector assembly with a central electrical terminal disposed within an insulative housing that is configured to move longitudinally within a shield terminal shown in a rearward position according to some embodiments.
Figure 6:
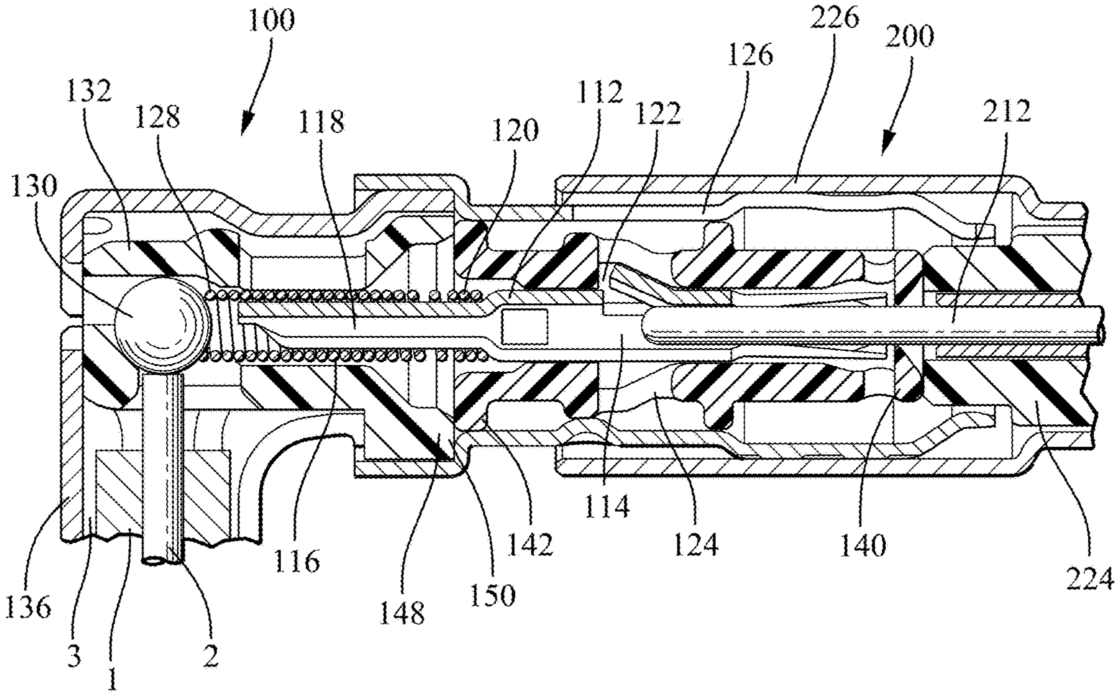
FIG. 6 shows a cross-section view of the electrical connector assembly of FIG. 5 with the central electrical terminal disposed within the insulative housing shown in a forward position according to some embodiments.

Another non-limiting example of a right-angled electrical connector assembly which includes a first electrical connector 100 having a central electrical terminal 112 with a tubular portion 114 configured to receive the corresponding mating central electrical terminal 212 of the mating second electrical connector 200 is shown in FIGS. 5 and 6. The central electrical terminal 112 also includes a coil spring 116 and a rod-like portion 118 extending from the tubular portion 114 is received in a first end 120 of the coil spring 116. The central electrical terminal 112 is disposed within a cavity 122 of a first insulative housing 124 which is surrounded by a first electrical shield terminal 126. The coil spring 116 has a second end 128 opposite the first end 120 that is in electrical and mechanical contact with a spherical sector shaped electrical contact 130 connected to the end of a central conductor 2 of an electrical cable 1. In the present embodiment, the electrical cable 1 is a coaxial cable. The coil spring 116 and the electrical contact 130 are disposed within a second insulative housing 132 enclosed within a second shield terminal 136 that is connected to the first shield terminal 126. The second insulative housing 132 and second shield terminal 136 hold the coaxial cable 1 at a perpendicular orientation to the central electrical terminal 112. The first insulative housing 124, and thereby the central electrical terminal 112 are movable within the first shield terminal 126 from a forward position 138, shown in FIG. 5, to a rearward position 140, shown in FIG. 6. The coil spring 116 forces the first insulative housing 124 and the central electrical terminal 112 toward the forward position 138. Movement of the first insulative housing 124 between the forward and rearward positions 138, 140 is limited by a lateral rib 142 projecting from the first insulative housing 124 that contacts a forward stop 144 provided by an indentation 146 formed in the first shield terminal 126, as shown in FIG. 5, and a rearward stop 148 provided by a forward surface 150 of the second insulative housing 132, as shown in FIG. 6. It is appreciated that the rearward stop may alternatively be provided by the coil spring 116 being in a fully compressed condition. The central electrical terminal 112 is configured to terminate the central conductor 2 of the coaxial cable 1 and the first and second electrical shield terminals 126, 136 terminate a shield conductor 3 of the coaxial cable 1.

The location of the forward and rearward stops 144, 148 are preferably chosen to ensure compressive contact between the first insulative housing 124 and the insulative housing 224 when the connector lock tab 306 of locking feature 304 is near the rearward-most location 408 in the connector lock slot 406, as shown in FIG. 3, or near the forward-most location 410 in the connector lock slot 406, as shown in FIG. 4. This inhibits the exposure of the central electrical terminals 112, 212 in an air gap that may otherwise occur in connector 10, see FIG. 1.

Returning to FIGS. 5 and 6, the first several coils near the first end 120 of the coil spring 116 are sized such that the coils are in radially compressive contact with the rod-like portion 118 of the central electrical terminal 112 while an inner diameter of the remaining coils is larger than the outer diameter of the rod-like portion 118, allowing the rod-like portion 118 to move freely within the coil spring 116. The coils near the second end 128 of the coil spring 116 extending past the rod-like portion 118 touch one another when the coil spring 116 is in a relaxed condition. This feature wherein the coils touch one another has also been found to improve the electromagnetic performance of the first electrical connector 100.

Figure 7:
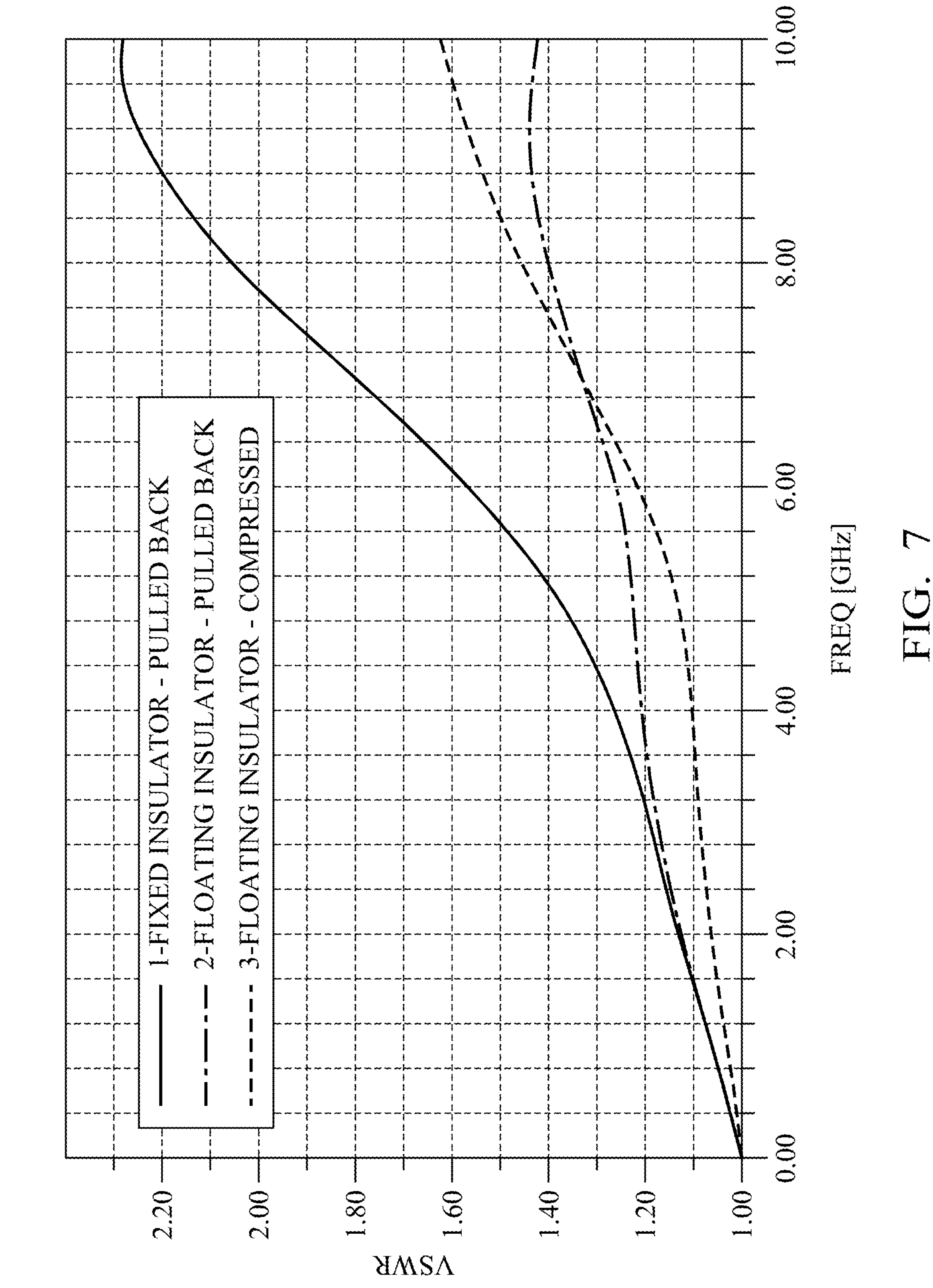
FIG. 7 shows a graph comparing voltage standing wave ratios (VSWR) vs. frequency for the electrical connector assemblies of FIGS. 1, 5, and 6 according to some embodiments.
Figure 8:
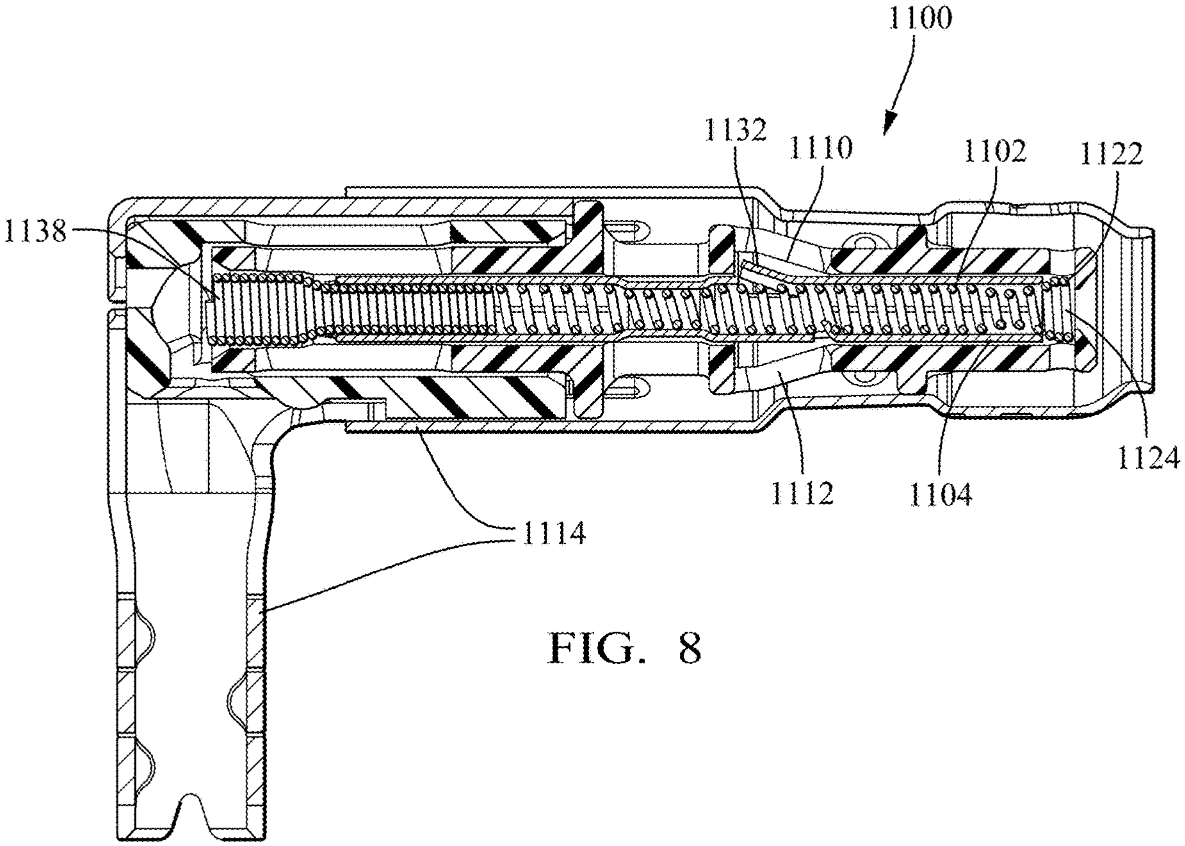
FIG. 8 shows a cross-section view of an electrical connector assembly with an electrical receptacle terminal having a helical coil spring configured to receive a corresponding electrical plug terminal according to some embodiments.

As shown in FIG. 7, the VSWR of the first electrical connector 100 is improved compared with the first electrical connector 10.

FIGS. 8-14 show a first non-limiting example of a right-angled electrical connector assembly, hereafter referred to as the assembly 1100. The assembly 1100 includes an electrical receptacle terminal 1102 in the form of a helical coil spring 1104 that is configured to receive a corresponding electrical plug terminal 1106, shown here in the form of a cylindrical pin, of a mating electrical connector assembly 1108. The electrical receptacle terminal 1102 is disposed within a cavity 1110 of an insulative housing 1112 which is surrounded by an electrical shield terminal 1114. The electrical receptacle terminal 1102 is configured to terminate a central conductor 1116 of an electrical cable 1118 and the electrical shield terminal 1114 terminates a shield conductor 1120 of the electrical cable 1118. In the present embodiment, the electrical cable 1118 is a coaxial cable.

Figure 9:
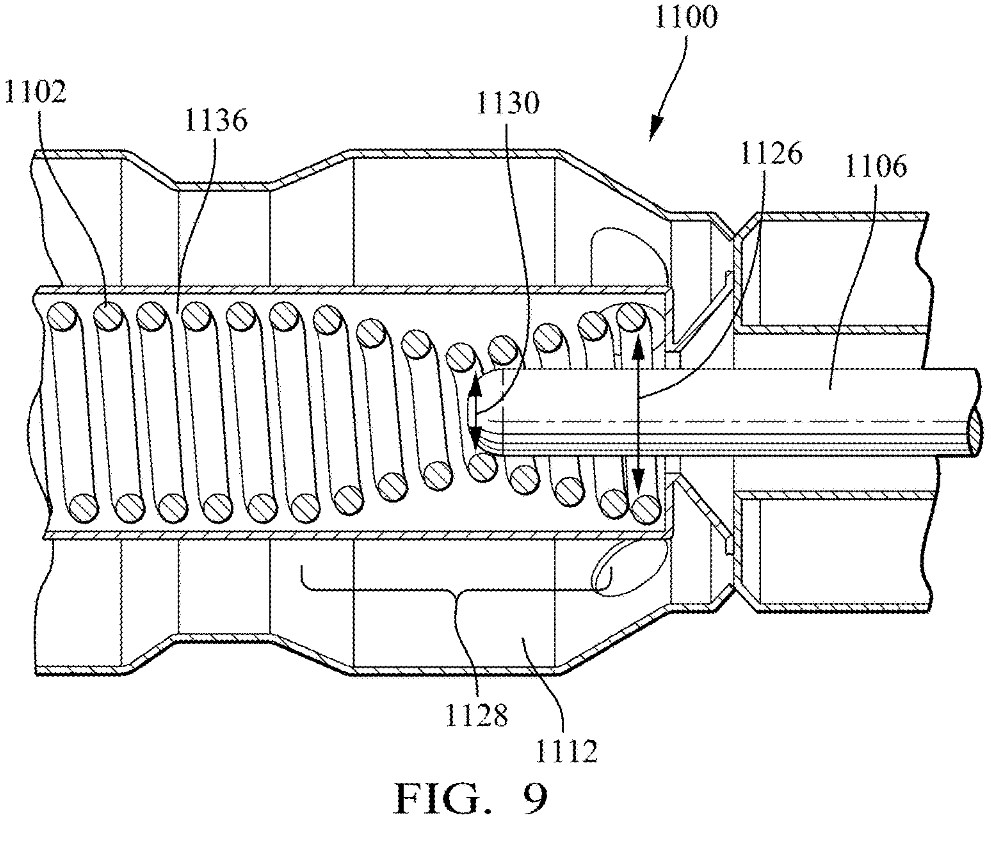
FIG. 9 shows a close up cross-section view of the interface between the helical coil spring of the electrical receptacle terminal of FIG. 8 and the corresponding electrical plug terminal according to some embodiments.

As best shown in FIG. 9, a first end 1122 of the coil spring 1104 has an opening 1124 with a first diameter 1126. A first portion 1128 of the coil spring 1104 near the first end 1122 has a second diameter 1130 that is reduced from, i.e., smaller than, the first diameter 1126. This first portion 1128 is configured to provide compressive contact between the receptacle terminal 1102 and the corresponding plug terminal 1106. The coil spring 1104 not only provides a compressive contact force between the receptacle and plug terminals 1102, 1106, the turns of the coil spring 1104 also provide a plurality of redundant contact points between the receptacle and plug terminals 1102, 1106, thereby improving the robustness of the electrical connection between the receptacle and plug terminals 1102, 1106.

Figure 10:
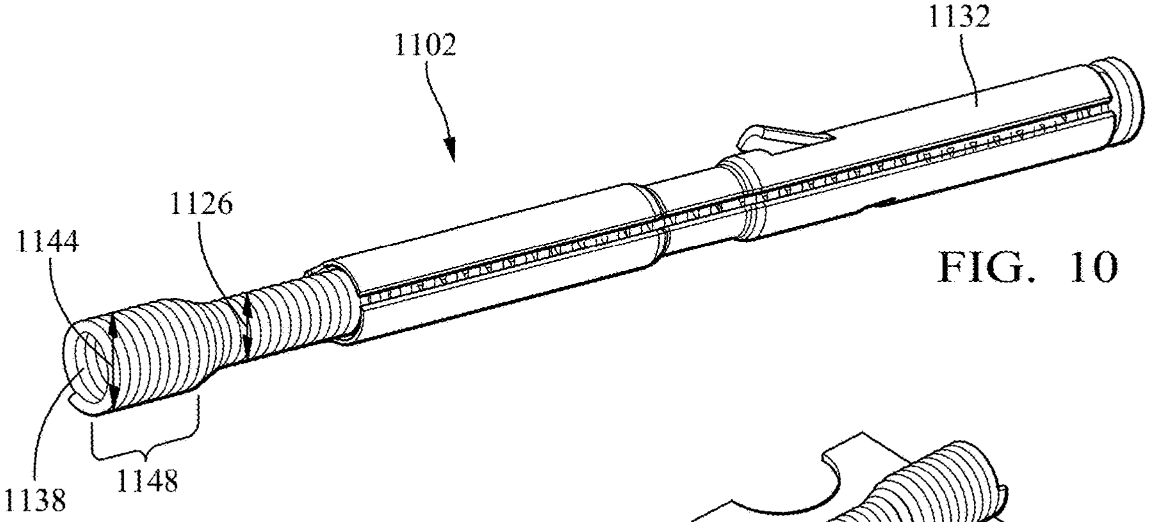
FIG. 10 shows a perspective view of the helical coil spring of the electrical receptacle terminal of FIG. 8 within an electrically conductive sleeve according to some embodiments.
Figure 11A:
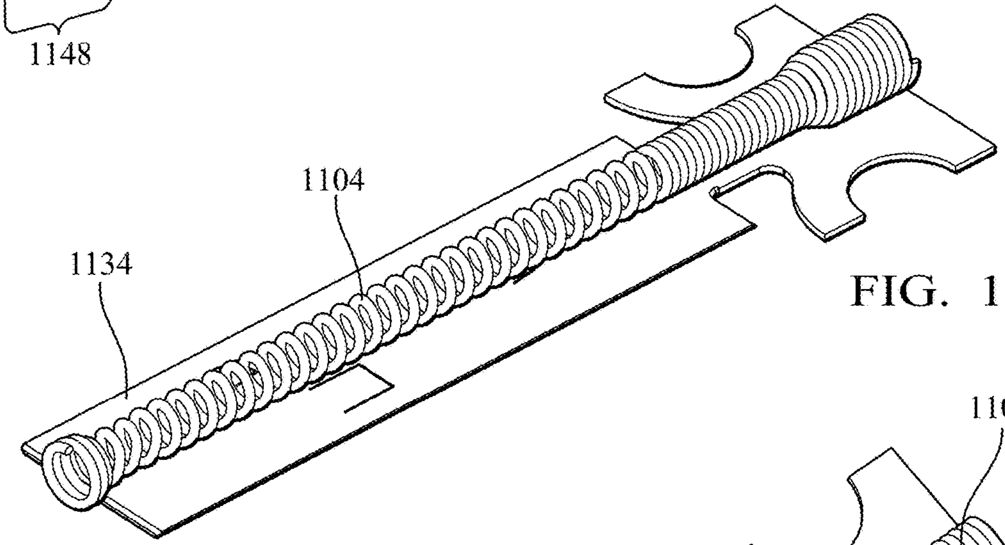
FIGS. 11A and 11B show various steps in a process of forming the electrically conductive sleeve of FIG. 10 around the helical coil spring according to some embodiments.
Figure 11B:
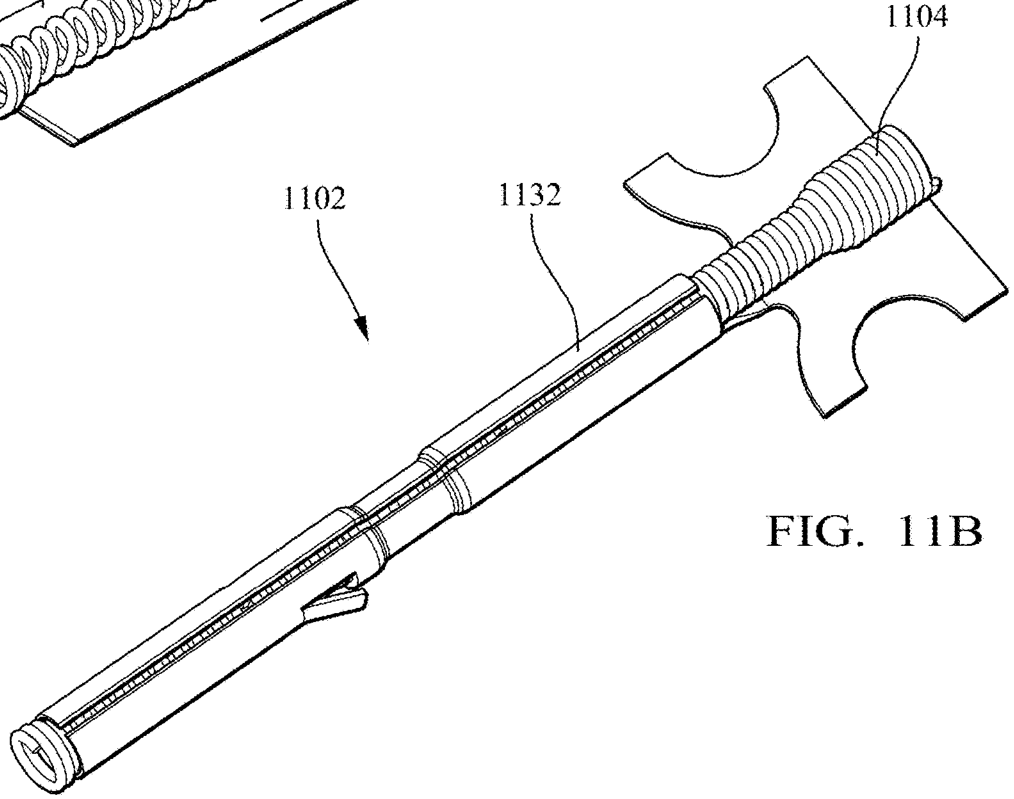

As shown in FIG. 10, the first portion 1128 of the coil spring 1104 is contained within a conductive sleeve 1132 that is at least partially radially wrapped around the first portion 1128. FIGS. 11A and 11B illustrate a process of forming conductive sleeve 1132 from a terminal preform 1134 stamped from flat sheet metal as shown in FIG. 11A and then rolled around the coil spring 1104 to form the conductive sleeve 1132 in FIG. 11B. This conductive sleeve 1132 improves the electromagnetic performance of the receptacle terminal 1102 by covering the gaps 1136 in the coil spring 1104 in and around the first portion 1128.

Figure 12:
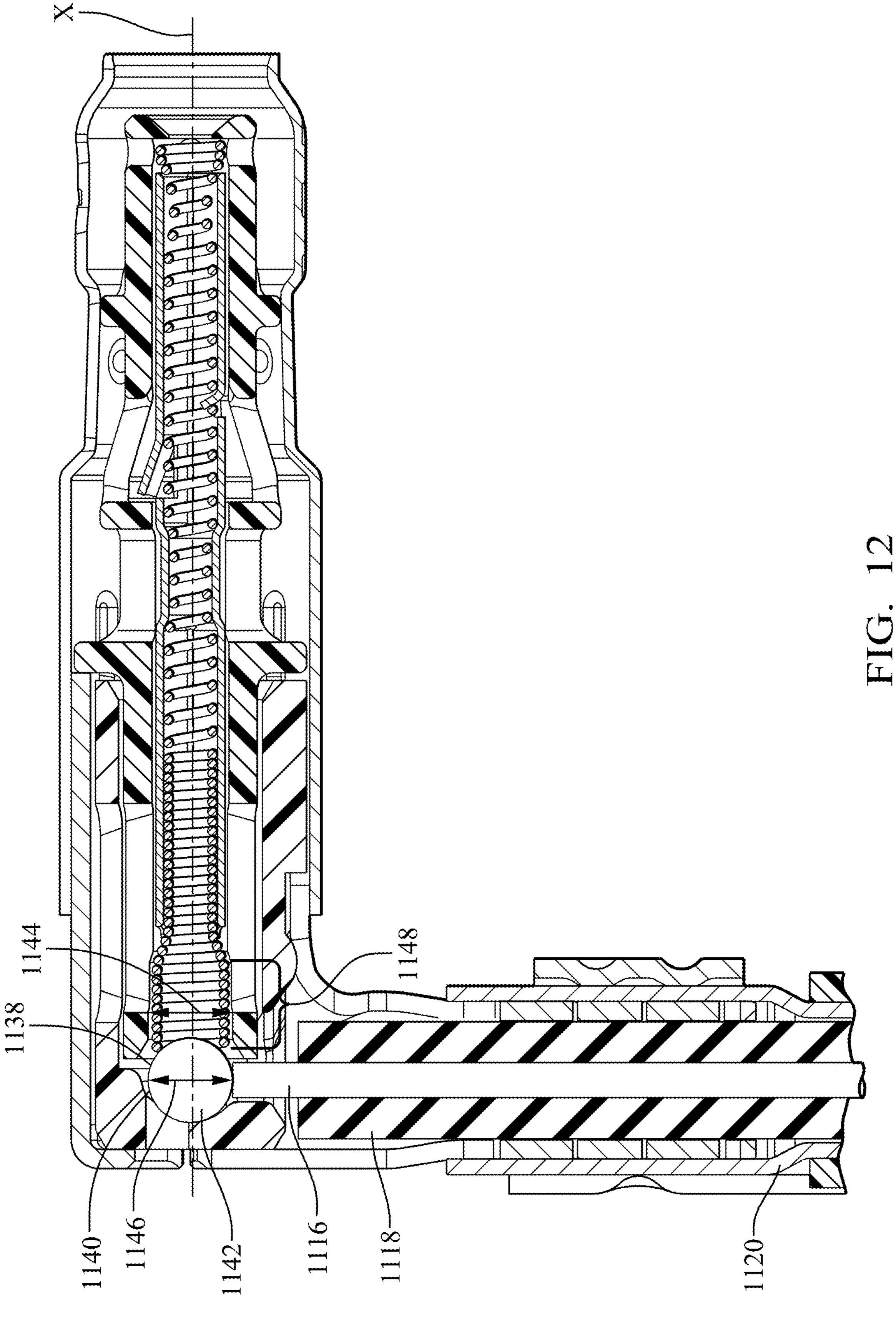
FIG. 12 shows a cross-section view of the electrical connector assembly of FIG. 8 further including an electrically conductive sphere terminating a conductor of an electrical cable according to some embodiments.
Figures 13, 14:
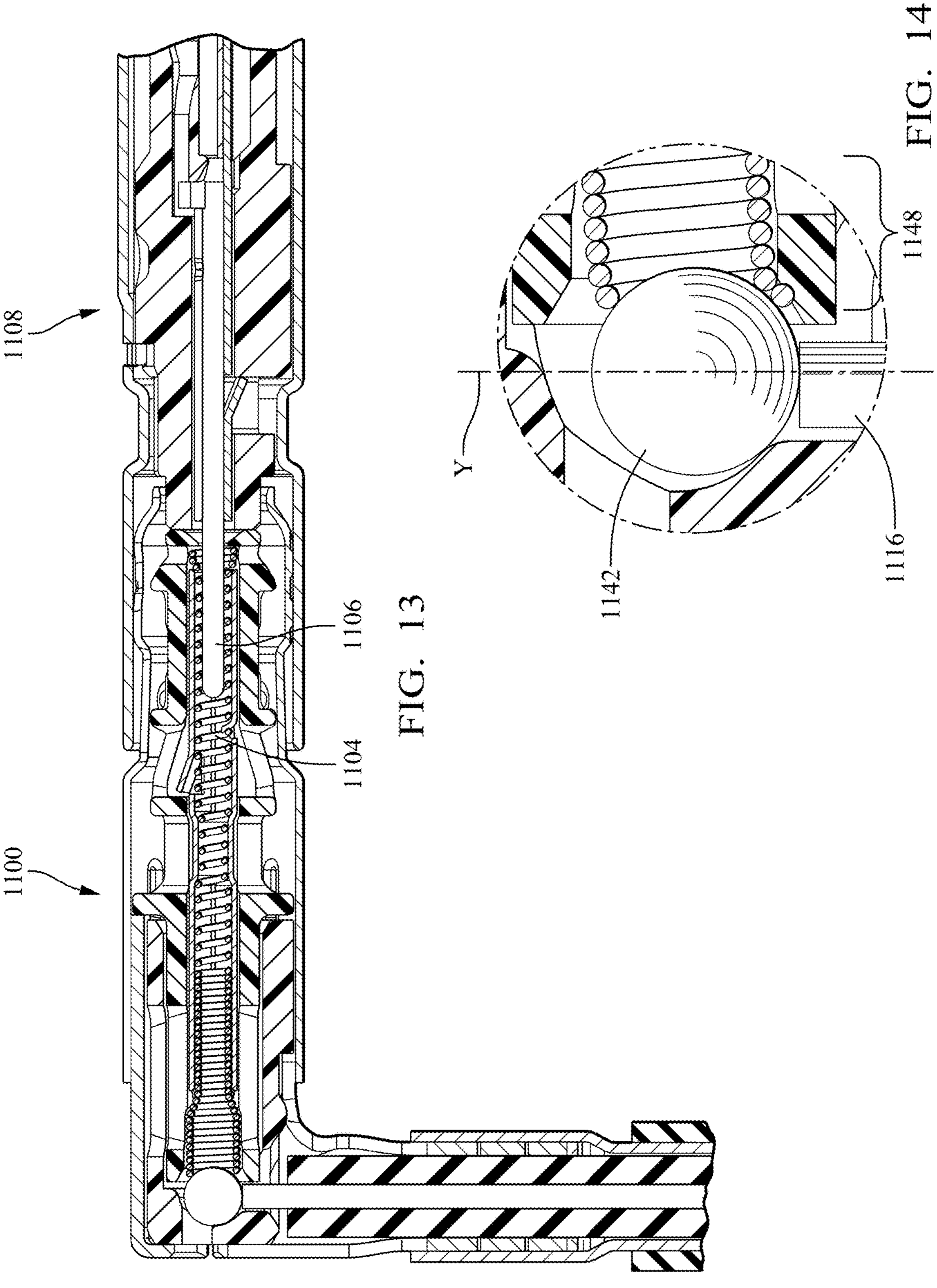
FIG. 13 shows a cross-section view of the electrical connector assembly of FIG. 8 interfacing with a corresponding electrical connector assembly including the corresponding electrical plug terminal according to some embodiments.
FIG. 14 shows a close up cross-section view of the interface between the helical coil spring of the electrical receptacle terminal of FIG. 8 and the electrically conductive sphere according to some embodiments.

A second end 1138 of the coil spring 1104 arranged opposite the first end 1122 is in compressive mechanical and electrical contact with an electrical contact 1140 connected to an end of the central conductor 1116 of the coaxial cable 1118. The electrical contact 1140 may define a spherical sector shaped electrical contact. In alternative embodiments, the electrical contact 1140 may have a flat or tubular shape. In this particular example, the spherical sector shape of the electrical contact 1140 is provided by an electrically conductive ball or sphere 1142 that is attached, e.g., welded, to the end of the central conductor 1116. The second end 1138 of the coil spring 1104 has a third diameter 1144 that is larger than the first diameter 1126 but less than a diameter 1146 of the sphere 1142. As shown in FIG. 12, the second end 1138 of the coil spring 1104 presses against the sphere 1142 in the longitudinal or X direction, the coil spring 1104 is thereby compressed and exerts a compressive contact force between the second end 1138 of the coil spring 1104 and the sphere 1142, thereby providing a robust electrical connection between the receptacle terminal 1102 and the central conductor 1116. As shown in FIG. 14, the coil spring 1104 may flex in the lateral or Y direction to accommodate some longitudinal misalignment between the coil spring 1104 and the sphere 1142.

Returning now to FIG. 10, the coils of the coil spring 1104 in a second portion 1148 of the coil spring 1104 located proximate the second end 1138 and extending from the conductive sleeve 1132 touch one another when the coil spring 1104 is in a relaxed condition. This feature wherein the coils touch one another has also been found to improve the electromagnetic performance of the receptacle terminal 1102.

Although the first and second ends 1122, 1138 of the coil spring 1104 are illustrated as having a blunt cut, other embodiments of the coil spring 1104 may be envisioned in which the first end 1122, the second end 1138, or both are flush cut.

Figure 15:
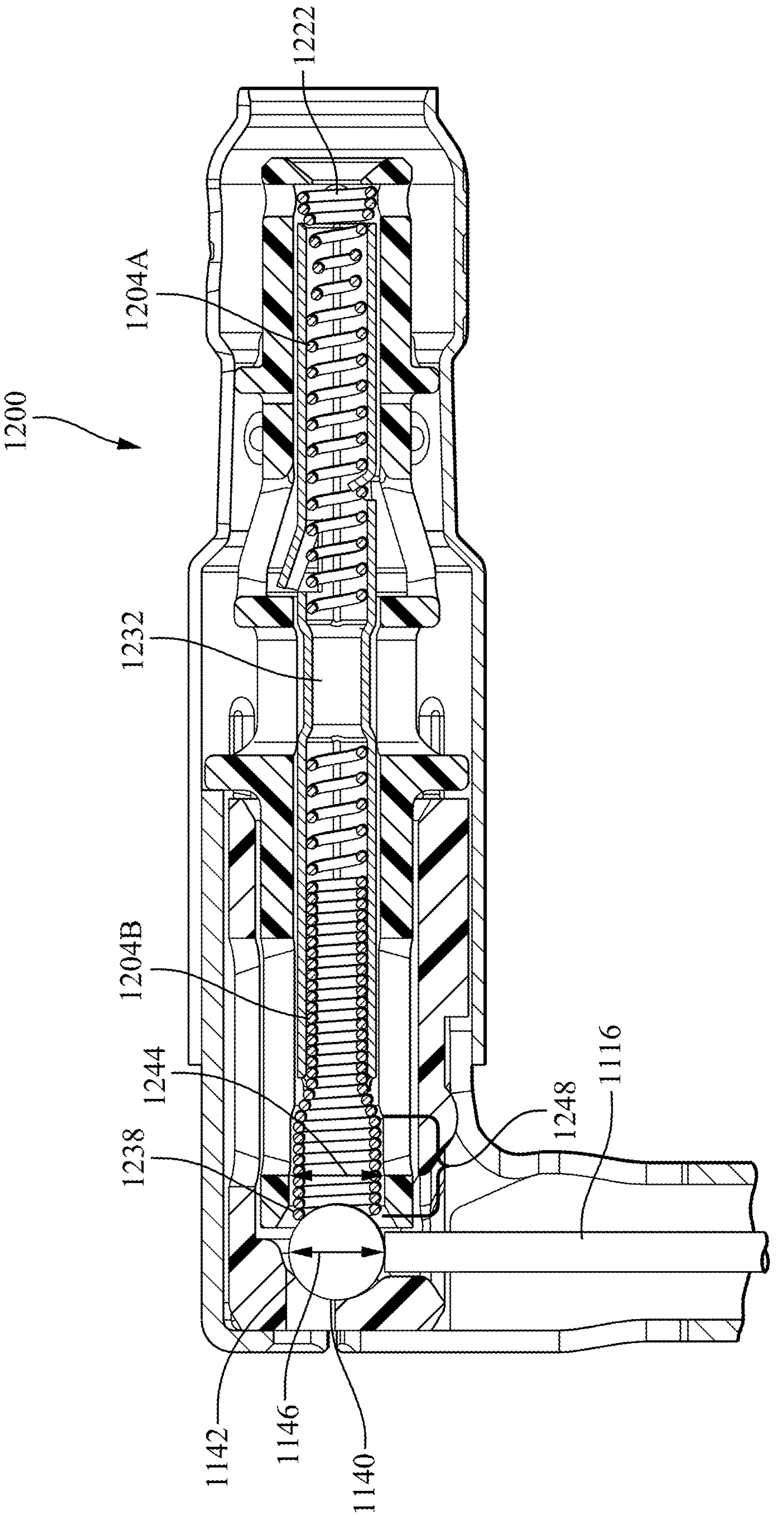
FIG. 15 shows a cross-section view of an electrical connector assembly with an electrical receptacle terminal having a first helical coil spring configured to receive a corresponding electrical plug terminal and a second helical coil spring configured to mechanically and electrically contact a spherical sector shaped electrical contact according to some embodiments.

FIG. 15 shows another non-limiting example of a right-angled electrical connector assembly, hereafter referred to as the assembly 1200. In this example, which is similar to assembly 1100, the coil spring is divided into two separate coil springs 1204A, 1204B that are electrically and mechanically connected by a conductive sleeve 1232. The first coil spring 1204A has a first end 1222 that is configured to receive the plug terminal 1106 of the mating electrical connector assembly 1108 and the second coil spring 1204B is configured to contact the electrical contact 1140 connected to the end of the central conductor 1116 of the coaxial cable 1118. The coils of the second coil spring 1204B in a portion 1248 of the second coil spring 1204B located proximate the second end 1238 and extending from the conductive sleeve 1232 touch one another when the second coil spring 1204B is in a relaxed condition. The second end 1238 is in compressive contact with the sphere 1142 of the electrical contact 1140. The diameter 1244 of the second end 1238 is less than a diameter 1146 of the sphere 1142. The second coil spring 1204B may flex in the lateral or Y direction to accommodate some longitudinal misalignment between the second coil spring 1204B and the sphere 1142.

Figure 16:
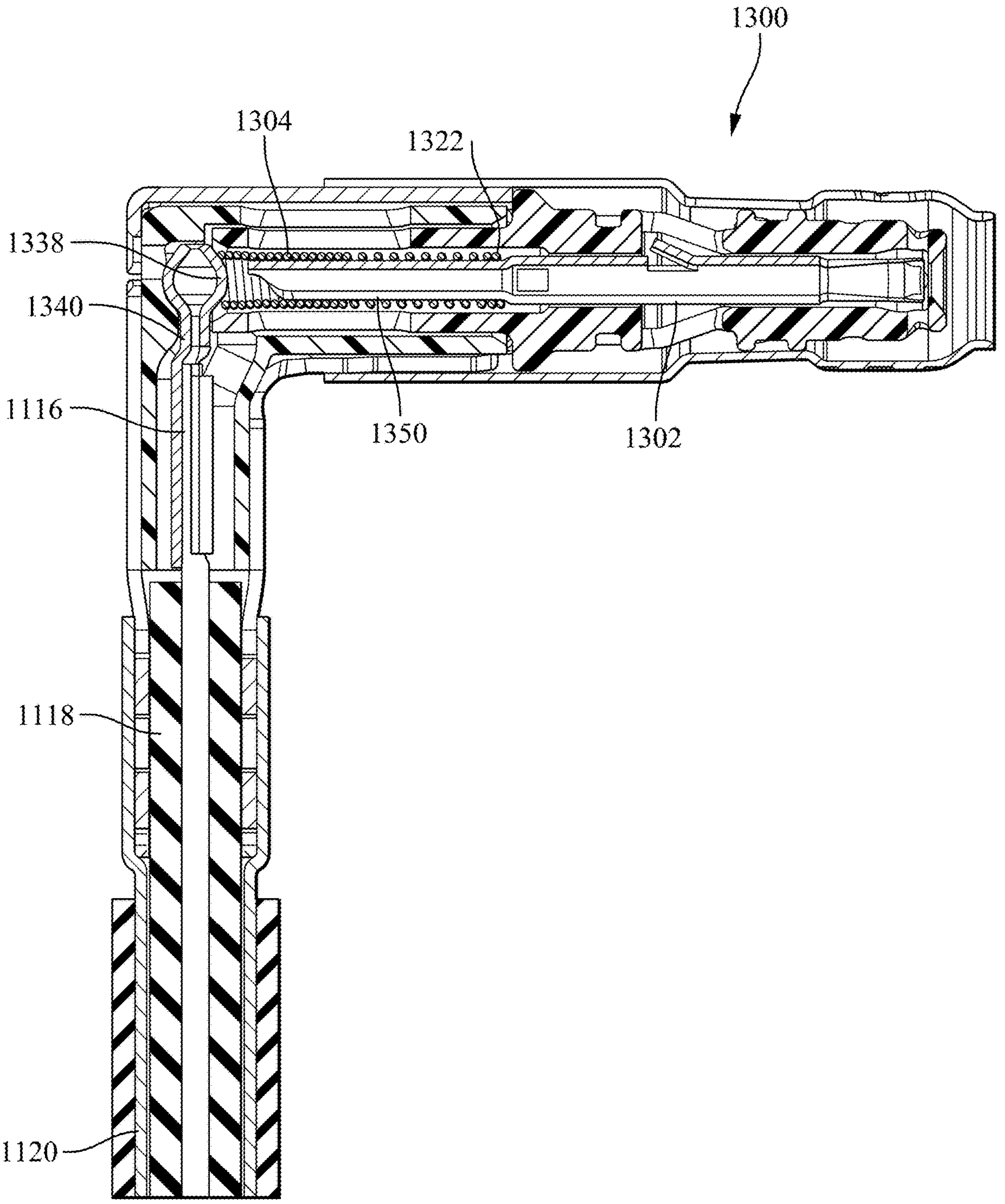
FIG. 16 shows a cross-section view of an electrical connector assembly with an electrical receptacle terminal having a helical coil spring configured to mechanically and electrically contact a spherical sector shaped electrical contact according to some embodiments.
Figure 17A:
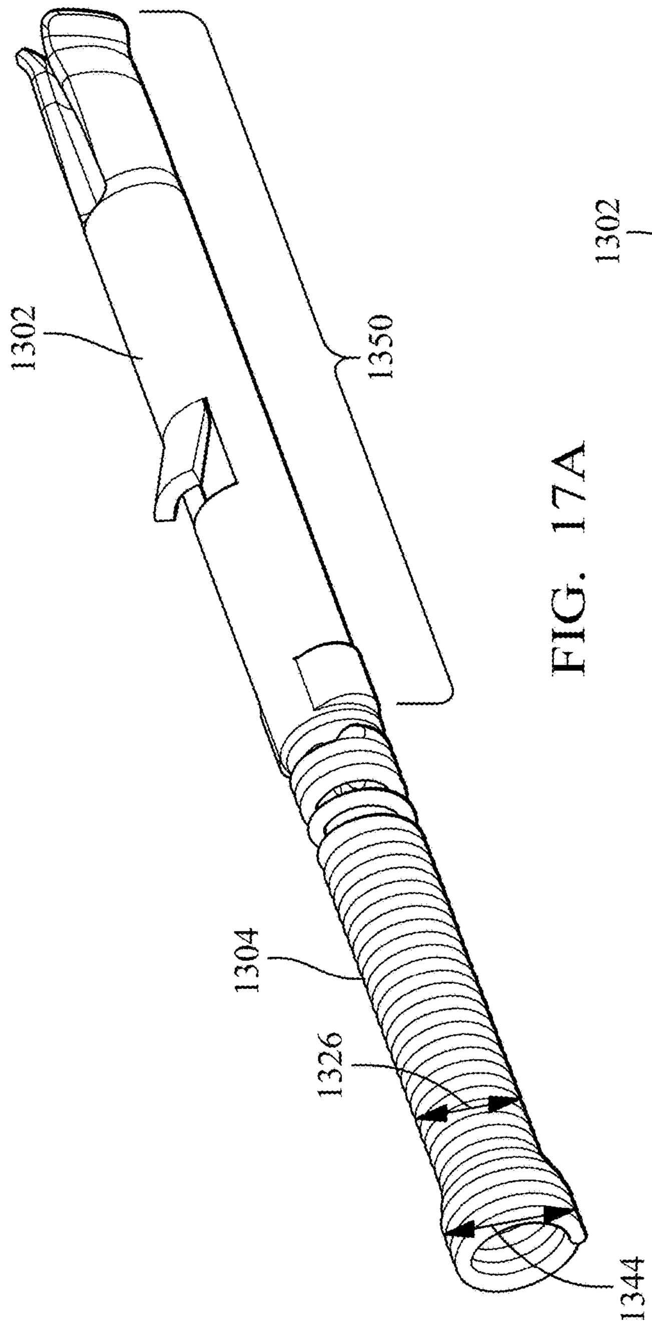
FIG. 17A shows a perspective view of the electrical receptacle terminal of FIG. 16 according to some embodiments.
Figure 17B:
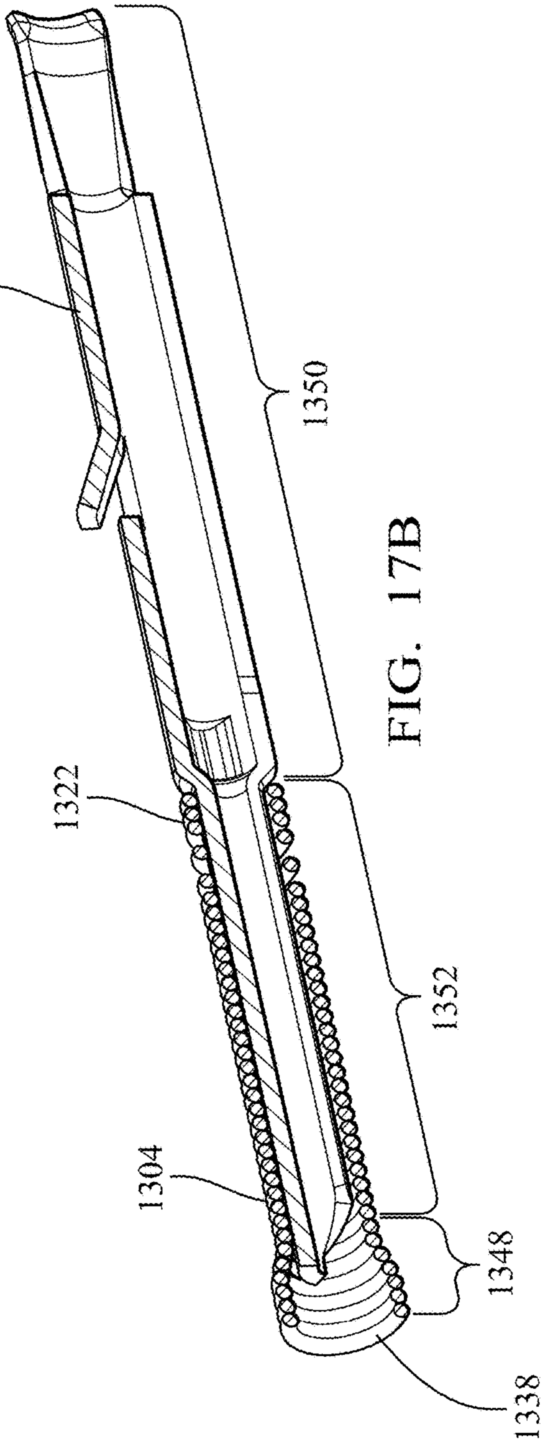
FIG. 17B shows a cross-section view of the electrical receptacle terminal of FIG. 16 according to some embodiments.
Figure 18:
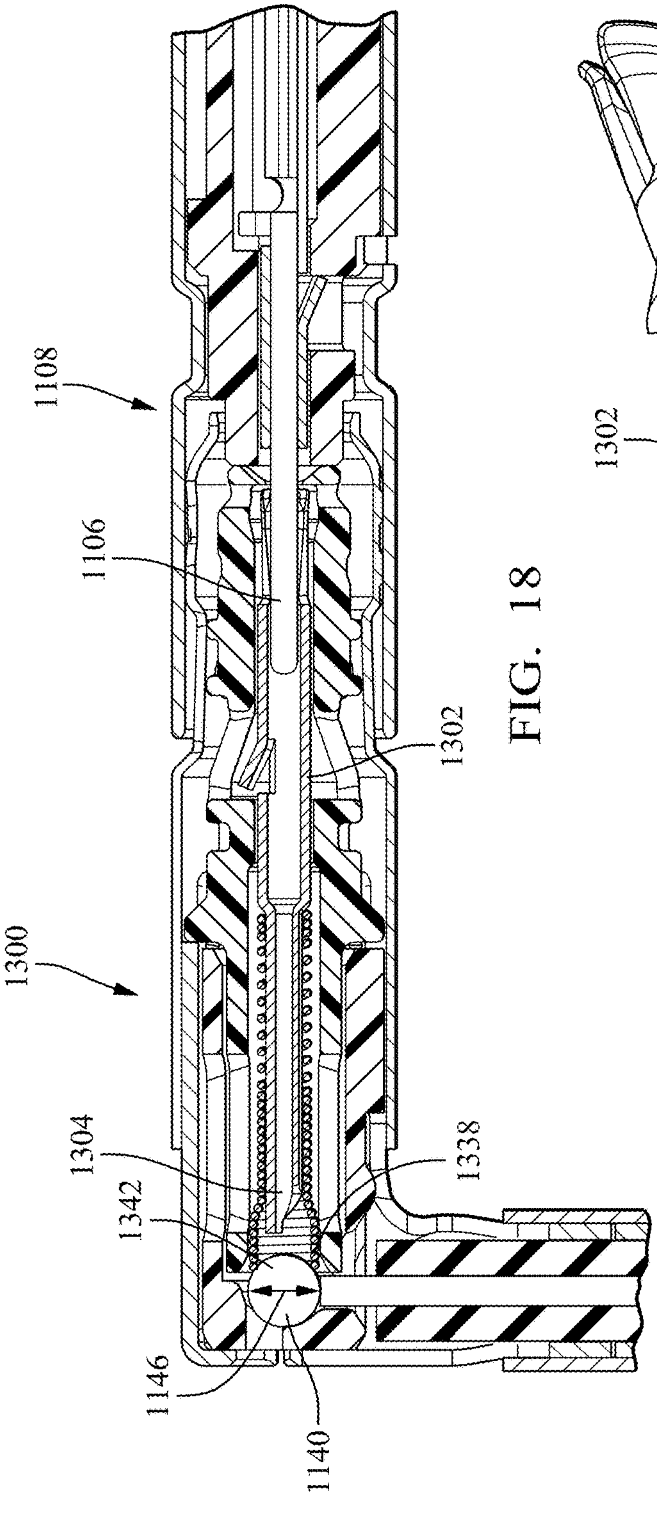
FIG. 18 shows a cross-section view of the electrical connector assembly of FIG. 16 interfacing with a corresponding electrical connector assembly according to some embodiments.

FIGS. 16-18 show yet another non-limiting example of a right-angled electrical connector assembly, hereafter referred to as the assembly 1300. In this example, which is similar to assemblies 1100 and 1200, the receptacle terminal 1302 shown in FIGS. 17A and 17B has a conventional stamped and rolled tubular portion 1350 that is configured to receive the plug terminal 1106. The receptacle terminal 1302 includes a coil spring 1304 and a rod-like portion 1352 extending from the tubular portion 1350 is received in a first end 1322 of the coil spring 1304. The coil spring 1304 extends between the first end 1322 and a second end 1338 opposite the first end 1322. The coils of the coil spring 1304 in a portion 1348 of the coil spring 1304 located proximate the second end 1338 and extending past the rod-like portion 1352 touch one another when the coil spring 1304 is in a relaxed condition.

In the example illustrated in FIGS. 16, 17A, and 17B, the second end 1338 of the coil spring 1304 is in compressive contact with an electrical terminal 1340 that is connected, e.g., crimped, to the end of the central conductor 1116 of a coaxial cable 1118. The electrical terminal 1340 defines a spherical sector shaped surface 1342 that is in compressive contact with the second end 1338 of the coil spring 1304. The portion 1348 of the coil spring 1304 has a diameter 1344 that is larger than a diameter 1326 of the rest of the coil spring 1304 but less than a diameter 1146 of the spherical sector shaped surface 1342.

In an alternative example illustrated in in FIG. 18, the second end 1338 of the coil spring 1304 is in compressive contact with the sphere 1142 of the electrical contact 1140 that is connected, e.g., welded, to the end of the central conductor 1116 of a coaxial cable 1118.

Figure 19:
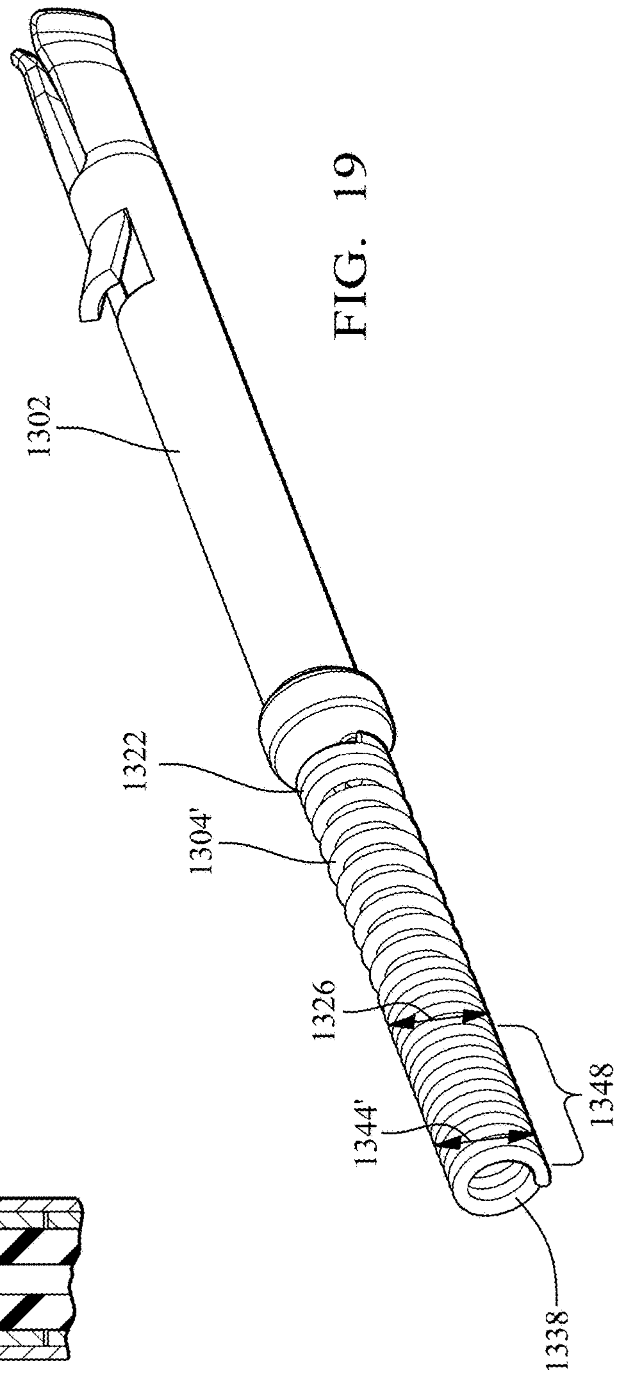
FIG. 19 shows a perspective view of an electrical receptacle terminal according to some embodiments.

FIG. 19 shows an alternative coil spring 1304' in which the portion 1348 of the coil spring 1304' has a diameter 1344' that is generally the same as a diameter 1326 of the rest of the coil spring 1304'.

The coil spring 1304 or 1304' may flex in the lateral or Y direction to accommodate some longitudinal misalignment between the coil spring 1304 or 1304' and the sphere 1142 or spherical sector shaped surface 1342.

Other embodiments may be envisioned in which the conductive sphere 1142 is welded to the central conductor 1116 and the electrical terminal 1340 that is crimped to the central conductor 1116 are interchanged.

While the illustrated examples are right angled electrical connectors, alternative embodiments may be envisioned for straight electrical connectors or other non-perpendicular arrangements between the plug terminal and the electrical cable. In addition, other alternative embodiments of electrical connector assemblies employed in other receptacle terminal-plug terminal configurations may also be envisioned.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

a central electrical terminal connected to a cable terminal attached to an end of a central conductor of an electrical cable configured to mate with a corresponding mating central electrical terminal, wherein the central electrical terminal comprises a helical coil spring in compressive contact with the cable terminal;

an insulative housing defining a cavity in which the central electrical terminal is affixed; and a shield terminal in which the insulative housing, central electrical terminal, and coil spring are disposed, wherein the insulative housing is configured to move longitudinally within the shield terminal and wherein the coil spring exerts a longitudinal force on the central electrical terminal and the insulative housing to maintain mechanical contact between the insulative housing and a corresponding insulative housing in which the corresponding mating central electrical terminal is disposed.

2. The electrical connector assembly according to claim 1, wherein a first portion of the coil spring is in radially compressive contact with the central electrical terminal.

3. The electrical connector assembly according to claim 2, wherein coils of a second portion of the coil spring are spaced apart from one another when the coil spring is in a relaxed condition.

4. The electrical connector assembly according to claim 3, wherein coils of a third portion of the coil spring are touching one another when the coil spring is in a relaxed condition.

5. The electrical connector assembly according to claim 3, wherein coils of a third portion of the coil spring in which the central electrical terminal is not disposed are touching one another when the coil spring is in a relaxed condition.

6. The electrical connector assembly according to claim 1, wherein a portion of the central electrical terminal is received within the coil spring and is rod-shaped.

7. The electrical connector assembly according to claim 1, wherein the central conductor of the electrical cable is arranged perpendicularly to the central electrical terminal.

8. The electrical connector assembly according to claim 1, wherein the insulative housing is movable between a rearward stop and a forward stop.

9. The electrical connector assembly according to claim 8, wherein the forward stop is provided by an indentation in the shield terminal.

10. The electrical connector assembly according to claim 8, wherein the rearward stop is provided by the coil spring when in a fully compressed condition.

11. The electrical connector assembly according to claim 8, wherein the electrical contact attached to the central conductor of the electrical cable defines a spherical sector shaped electrical contact.

12. The electrical connector assembly according to claim 11, wherein the electrical contact is an electrically conductive sphere attached to an end of the central conductor of the electrical cable.

13. The electrical connector assembly according to claim 11, wherein the insulative housing is a first insulative housing defining a first cavity.

14. The electrical connector assembly according to claim 13, wherein the first insulative housing is disposed within a first section of the shield terminal.

15. The electrical connector assembly according to claim 14, wherein the assembly further comprises a second insulative housing defining a second cavity in which the electrical contact and an end of the central conductor of the electrical cable are disposed.

16. The electrical connector assembly according to claim 15, wherein the second insulative housing is disposed in a second section of the shield terminal attached to the first section of the shield terminal.

17. The electrical connector assembly according to claim 15, wherein a forward edge of the second insulative housing provides the rearward stop.

* * * * *